US010102384B2

(12) United States Patent
Freitas Fortuna dos Santos et al.

(10) Patent No.: US 10,102,384 B2
(45) Date of Patent: Oct. 16, 2018

(54) DIGITAL CONTENT EXECUTION CONTROL MECHANISM

(71) Applicant: Jscrambler S.A., Porto (PT)

(72) Inventors: Antonio Pedro Freitas Fortuna dos Santos, Maia (PT); Rui Miguel Silvares Ribeiro, Lisbon (PT); Filipe Manuel Gomes Silva, Povoa do Varzim (PT)

(73) Assignee: JSCRAMBLER S.A., Oporto (PT)

( * ) Notice: Subject to any disclaimer, the term of this patent is extended or adjusted under 35 U.S.C. 154(b) by 190 days.

(21) Appl. No.: 14/894,931

(22) PCT Filed: May 30, 2014

(86) PCT No.: PCT/IB2014/061837
§ 371 (c)(1),
(2) Date: Nov. 30, 2015

(87) PCT Pub. No.: WO2014/191965
PCT Pub. Date: Dec. 4, 2014

(65) Prior Publication Data
US 2016/0117511 A1  Apr. 28, 2016

Related U.S. Application Data

(60) Provisional application No. 61/828,734, filed on May 30, 2013.

(51) Int. Cl.
*G06F 21/60* (2013.01)
*G06F 21/10* (2013.01)
(Continued)

(52) U.S. Cl.
CPC ............ *G06F 21/602* (2013.01); *G06F 21/10* (2013.01); *G06F 21/125* (2013.01); *G06F 21/54* (2013.01);
(Continued)

(58) Field of Classification Search
CPC ........ G06F 21/10; G06F 21/125; G06F 21/54; G06F 21/602; G06F 2221/033;
(Continued)

(56) References Cited

U.S. PATENT DOCUMENTS 5,774,651 A * 6/1998 Akiyama ................ G06F 21/10
 705/59
6,668,325 B1 * 12/2003 Collberg ................ G06F 21/14
 713/194

(Continued)

FOREIGN PATENT DOCUMENTS

FR 2887097 12/2006
WO 03012603 2/2003

OTHER PUBLICATIONS

Michael Cobb, "The Advantages of Digital Watermarking in Exterprise Data Protection", Retrieved From http://searchsecurity.techtarget.com/answer/The-advantages-of-digital-watermarking-in-enterprise-data-protection, Published Jul. 2013.*

(Continued)

*Primary Examiner* — Chau Le
(74) *Attorney, Agent, or Firm* — Harness, Dickey & Pierce, P.L.C.

(57) ABSTRACT

The present disclosure provides a method and system for generating digital content for a computing device which will function on the computing device only after successful validation. The system installs one or more checks in the digital content that restrict the execution of the digital content to a specific device for which the digital content is generated. The checks pertain to at least one or more parameters of a device including without limitation, a device ID, a device model, or any device specific feature. In (Continued)

addition, the system generates a protected version of the digital content with the one or more installed checks to be transmitted to a client.

14 Claims, 7 Drawing Sheets

(51) Int. Cl.
    *H04L 29/06*     (2006.01)
    *G06F 21/12*     (2013.01)
    *G06F 21/54*     (2013.01)
    *H04L 9/08*     (2006.01)
    *H04W 4/50*     (2018.01)
    *H04L 29/08*     (2006.01)

(52) U.S. Cl.
    CPC ........ *H04L 9/0819* (2013.01); *H04L 63/0435* (2013.01); *G06F 2221/033* (2013.01); *H04L 67/02* (2013.01); *H04L 67/34* (2013.01); *H04L 2209/24* (2013.01); *H04L 2463/041* (2013.01); *H04W 4/50* (2018.02)

(58) Field of Classification Search
    CPC ........... G06F 17/30867; H04L 2209/24; H04L 2463/041; H04L 63/0435; H04L 67/02; H04L 67/34; H04L 9/0819; H04W 12/08
    See application file for complete search history.

(56) References Cited

U.S. PATENT DOCUMENTS

| | | | |
|---|---|---|---|
| 7,054,443 B1* | 5/2006 | Jakubowski | G11B 20/00086 380/201 |
| 8,887,290 B1* | 11/2014 | Denton | G06F 21/00 726/26 |
| 2002/0016919 A1* | 2/2002 | Sims, III | G06F 21/10 713/193 |
| 2002/0083318 A1 | 6/2002 | Larose | |
| 2002/0144153 A1* | 10/2002 | LeVine | G06F 21/10 726/33 |
| 2004/0054894 A1* | 3/2004 | Lambert | G06F 21/10 713/165 |
| 2004/0123104 A1* | 6/2004 | Boyen | G06F 21/602 713/165 |
| 2005/0021989 A1* | 1/2005 | Johnson | G06F 21/10 713/194 |
| 2005/0021995 A1* | 1/2005 | Lal | G06F 21/10 726/4 |
| 2005/0069131 A1* | 3/2005 | de Jong | G06F 21/14 380/239 |
| 2006/0048228 A1* | 3/2006 | Takemori | G06F 21/577 726/22 |
| 2007/0208953 A1* | 9/2007 | Durand | G06F 21/10 713/193 |
| 2009/0061934 A1* | 3/2009 | Hauck | H04W 8/265 455/558 |
| 2011/0055917 A1 | 3/2011 | Wickstrom | |
| 2012/0124372 A1* | 5/2012 | Dilley | H04L 67/2819 713/162 |
| 2014/0201527 A1* | 7/2014 | Krivorot | G06F 21/6209 713/168 |

OTHER PUBLICATIONS

Application No. PCT/IB2014/061837, International Search Report and Written Opinion, dated Nov. 4, 2014.
"PHP Javascript Obfuscator", Wiseloop, Oct. 18, 2012, pp. 3.

* cited by examiner

DIGITAL CONTENT EXECUTION CONTROL MECHANISM

FIELD OF THE INVENTION

The present disclosure relates to digital content, specifically, the present disclosure relates to systems and methods for providing one or more device locks in the digital content and execution of the same on a computing device.

BACKGROUND OF THE INVENTION

The variety of applications available for devices like laptops, mobile phones, tablets, netbooks, and other computing devices have not only increased demand for such devices but have also made them a necessity. In addition to basic communication/computing capability of the devices, the applications installed on the devices may allow users to perform varied functions like access information, improve interactivity with customers, work from remote locations, contact administrative departments, access multimedia content, etc. Generally, there may be two types of applications, namely, native applications, which may be developed using native technologies and tend to work on devices for which they are developed using closed compiled code; and web-based applications, which may be developed using a language readable by everyone, for example, a markup language, a markup language (for example, hypertext markup language 5 (HTML5)) or JavaScript.

Application developers may develop an application using a language that is widely acceptable as it becomes easier for them to release versions of the application for all platforms. However, as the code may be accessible (for example, in clear text), it may give rise to code protection problems. For instance, competitors may steal the code and reuse it for their own applications, therefore, saving upon the initial investments (for example, time, cost, etc.) needed to produce an equivalent code; or there may be pirated versions of the code that may be leaked onto the Internet. These versions may be accessed by users who may be able to install and execute the code without buying it.

A number of techniques have been employed to counter this problem. For example, before the code is transmitted, it is encrypted using a random key or a hash key. At the client (for example, a mobile phone or a laptop) or a computing device, the encrypted code is decrypted by using the random key or hash key transmitted by the server. However, once the code is decrypted, it can be installed on any other client. Therefore, there is a need for a mechanism that solves the above problems and provides for a validation mechanism that restricts the execution of web applications to the client for which it is transmitted.

SUMMARY OF THE INVENTION

The present disclosure obviates the above drawbacks and provides a method and apparatus for installing a digital content for example, an application on a computing device after successful validation.

In one embodiment of the present disclosure, a method for generating a protected version of a digital content is disclosed. The method installs at least one check in the digital content where the at least one check includes at least one device parameter and the at least one check is successfully validated when executed on a client corresponding to the at least one device parameter. The method then protects the digital content including the installed at least one check using the at least one device parameter, thereby, generating the protected version of the digital content.

In accordance with another embodiment, a method for generating a protected version of a digital content is disclosed. The method installs at least one check in the digital content and protects the digital content using at least one device parameter simultaneously. The at least one check is based upon the at least one device parameter and the at least one check is successfully validated when executed on a client corresponding to the at least one device parameter.

In accordance with another embodiment, a method for validation of a digital content is provided. The method executes the digital content which includes an encrypted content and a decryption logic, generates a decryption key using the decryption logic and at least one device parameter accessed from a client and decrypts the encrypted content using the decryption key such that the decrypting implements at least one check to validate that the decrypted content is executed on a correct client.

In accordance with yet another embodiment, a method for validation of digital content is disclosed. The method includes executing a protected version of the digital content, the protected version including an obfuscated content and at least one check and implementing the at least one check by matching one or more device parameters included in the check with one or more device parameters accessed from a client to validate that the obfuscated content is executed on a correct client.

In accordance with yet another embodiment, a system for generation of a protected version of a digital content is presented. The system includes an encryption module configured to install at least one check in the digital content such that the at least one check corresponds to at least one device parameter and encrypt the digital content using the at least one device parameter. The system also includes a decryption module to generate a decryption logic based upon the at least one device parameter and an engine to concatenate the encrypted digital content and the decryption logic to generate the protected version of the digital content.

In accordance with another embodiment, a system for generation of a protected version of a digital content is disclosed. The system includes an obfuscation module configured to install at least one check in the digital content such that the at least one check corresponds to at least one device parameter and obfuscate the digital content using the at least one device parameter.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

DESCRIPTION OF THE INVENTION

Figure 1:
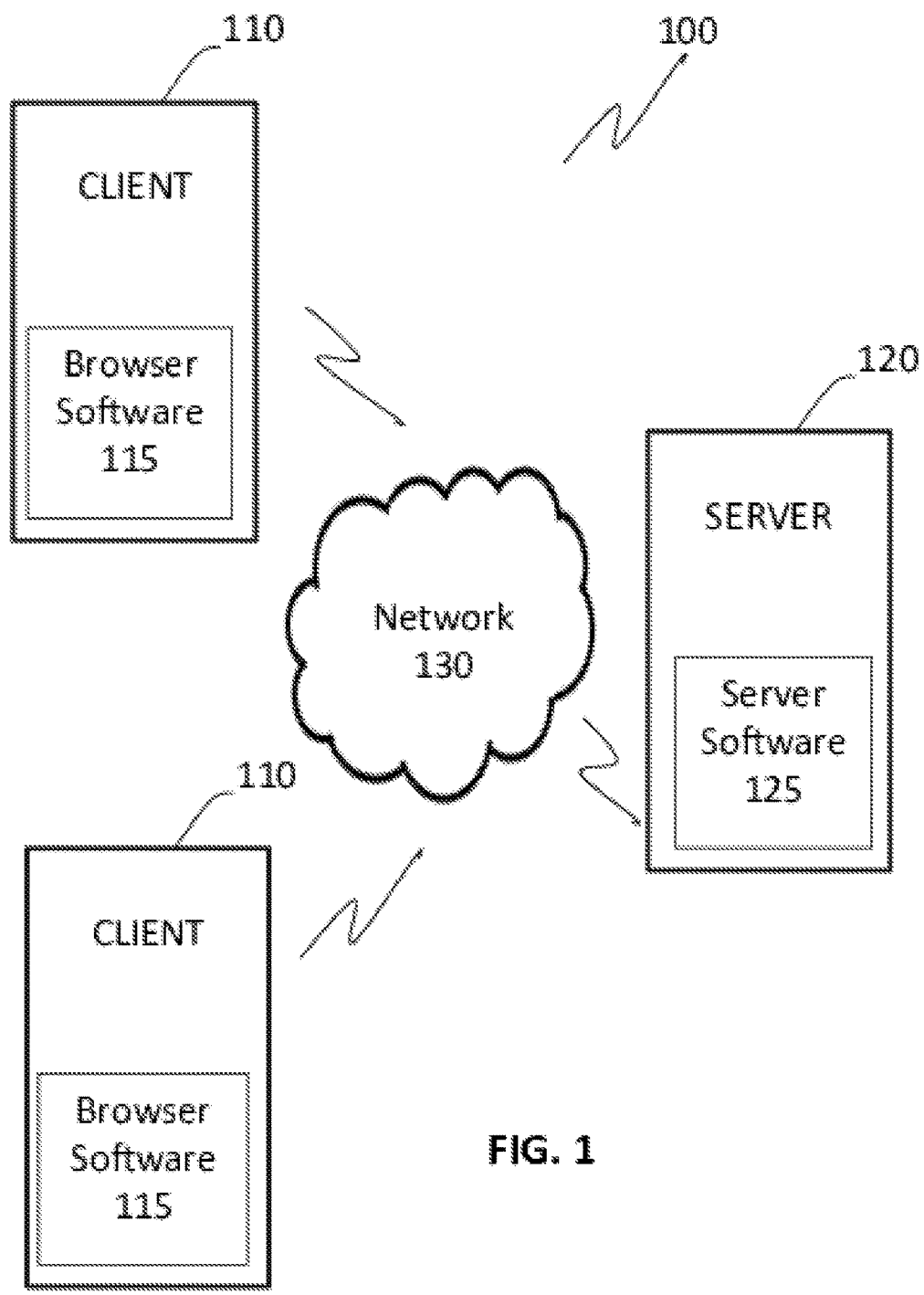
FIG. 1 is an exemplary diagram of an environment 100 in which systems and methods consistent with the principles of the invention may be implemented.

For the purpose of promoting an understanding of the principles of the invention, reference will now be made to the embodiments illustrated in the drawings and specific language will be used to describe the same. It will be understood by those skilled in the art that the foregoing general description and the following detailed description are exemplary and explanatory of the invention and are not intended to be restrictive thereof.

Many of the functional units described in this specification have been labeled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organised as an object, procedure, or function. Nevertheless, the executables of an identified module need not be physically located together, but may comprise disparate instructions stored in different locations which, when joined together, comprise the module and achieve the stated purpose for the module. Indeed, a module of an executable code could be a single instruction, or many instructions, and may even be distributed over several different code segments, among different programs, and across several memory devices. Similarly, operational data may be identified and illustrated herein within modules, and may be embodied in any suitable form and organised within any suitable type of data structure. The operational data maybe collected as a single data set, or may be distributed over different locations including over different member disks, and may exist, at least partially, merely as electronic signals on a system or network.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

The present disclosure provides a method and system for generating digital content for a computing device which will function on the computing device only after successful validation. The digital content includes without limitation one or more web applications, for example, mobile applications, home appliances applications, automotive applications, clothing or wearable applications, smart watch applications, smart television applications, etc. The method and system extends to the digital content developed using without limitation, a markup language (for example, HTML5), JavaScript, Cascading Style Sheets (CSS), etc. The system installs one or more checks in the digital content that restrict the execution of the digital content to a specific device for which the digital content is generated. The checks pertain to at least one or more parameters of a device including without limitation, a device ID, a device model, or any device specific feature. In addition, the system generates a protected version of the digital content with the one or more installed checks to be transmitted to a client. In an embodiment, the system may install checks that pertain to a device ID and these checks may be verified each time the digital content is executed on a client.

FIG. 1 is an exemplary diagram of an environment 100 in which systems and methods consistent with the principles of the invention may be implemented. Environment 100 may include multiple clients 110 connected to one or more servers 120 via a network 130. Network 130 may include a local area network (LAN), a wide area network (WAN), a telephone network, such as the Public Switched Telephone Network (PSTN), an intranet, the Internet, or a combination of networks. Two clients 110 and a server 120 have been illustrated as communicating via the network 130 for simplicity. In practice, there may be more or fewer clients and servers. Also, in some instances, a client may perform the functions of a server and a server may perform the functions of a client.

Clients 110 may be computing devices such as a wireless telephones, a personal computers, personal digital assistants (PDA), laptops, tablets or another type of computation and/or communication devices, a thread or process running on one of these devices, and/or an object executable by one of these devices. Server 120 may include a computational device for example a dedicated computer, that responds to the requests of one or more clients 110 and has data processing capability. Clients 110 and server 120 may connect to network 130 via wired, wireless, optical or any other type of connection that allows communication.

Clients 110 may include client software, such as browser software 115. Browser software 115 may include a web browser, such as Google Chrome or Netscape Navigator browsers. In a typical scenario, a user of client 110 using web browser 115 requests a web page or digital content (by URL, link within an email, link within a web page, or otherwise). The digital content includes without limitation, web applications. In the illustrated example, the request is sent to a known server 120. Client 110 receives the protected version of the digital content via Internet 130 from the server 120 (or other repository). By way of example, the digital code can be a Java Script code, an HTML code or Cascading Style Sheets (CSS). The digital content will execute only when the checks installed in the content are successfully validated. These checks are device-specific, therefore, digital content meant for one client cannot be executed on another client.

Server 120 may operate as a web server and include appropriate web server software 125. In one implementation, web server software 125 may function as protected digital content generation system. The web server software 125 may include an encryption module, an obfuscation module, a database, an interface and/or an engine for generating a protected version of the digital content after encrypting, obfuscating, and/or installing checks in the digital content in a manner consistent with the principles of the invention. These will be further explained in FIG. 2. Although server 120 is illustrated as a single entity, in practice, server 120 may be implemented as a number of server devices.

Server 120 maybe used by for example, an application developer or an application distribution system to host the digital content. In an embodiment, when a user requests for digital content, for example, a web application, from the server 120, the server 120 generates the protected version of that application on the fly using at least one device parameter, and provides it to the user to download it and install it. This protected version will work on the client 110 only if the device parameter in the application matches the actual device parameter of the device on which the application is installed. In fact, each time the application is executed, the checks would be redone and only if the checks are successful, the application will work.

Figure 2:
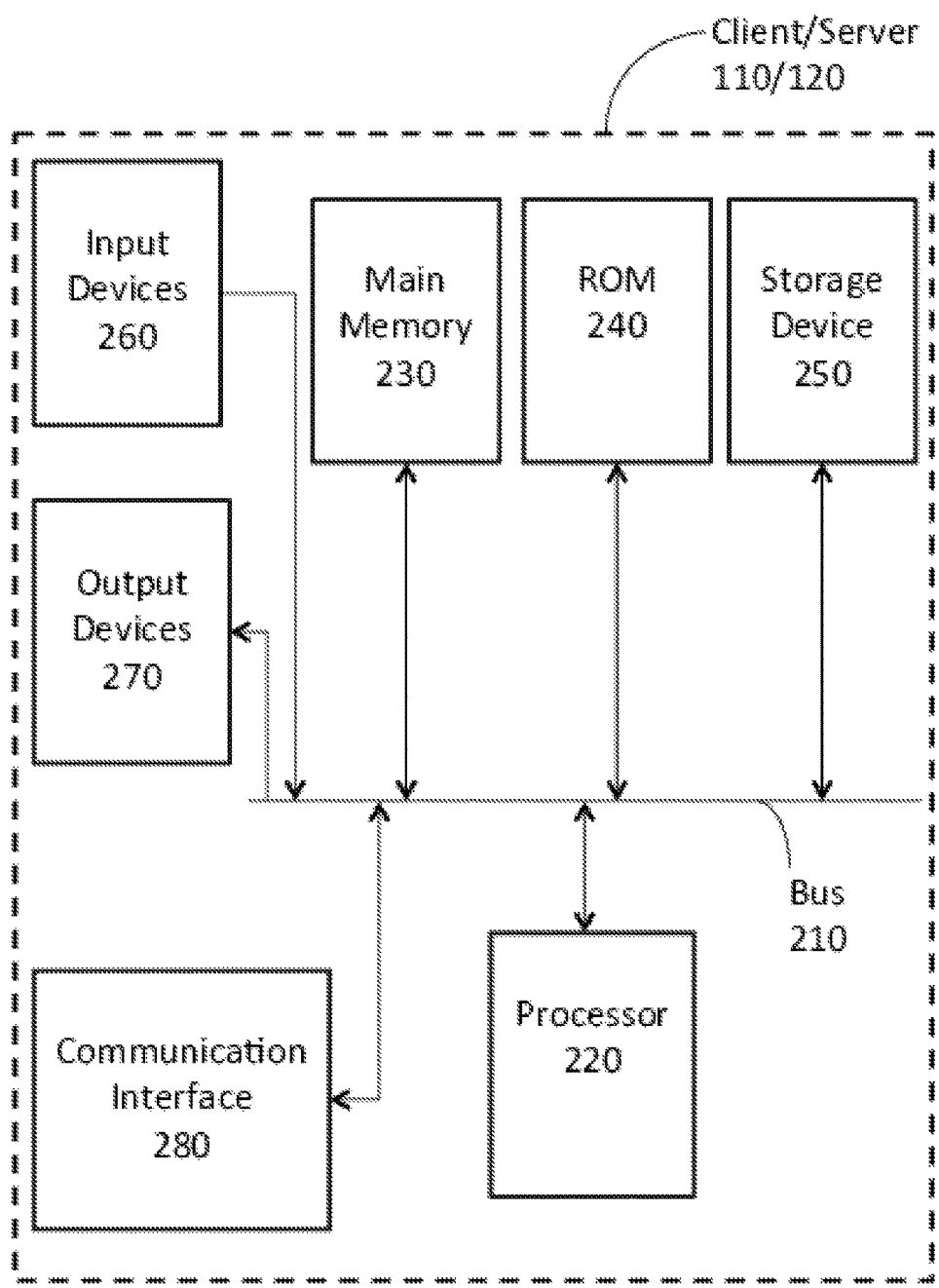
FIG. 2 is an exemplary diagram of a client 110 or server 120 according to an implementation consistent with the principles of the invention.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor, or a combination of processors, that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, a touch screen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client/server 110/120 to communicate with other devices and/or systems. For example, communication interface 280 may include mechanisms for communicating with another device or system via a network, such as network 130.

The software instructions defining server software 125 and/or browser software 115 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software. As mentioned, server software 125 may implement a protected digital content generation system that, based on a client request, generates a protected version of digital content. The protected version may either be encrypted or obfuscated using device parameters and will work on the client 110 only if the protected version is executed on the correct client as described below.

Figure 3A:
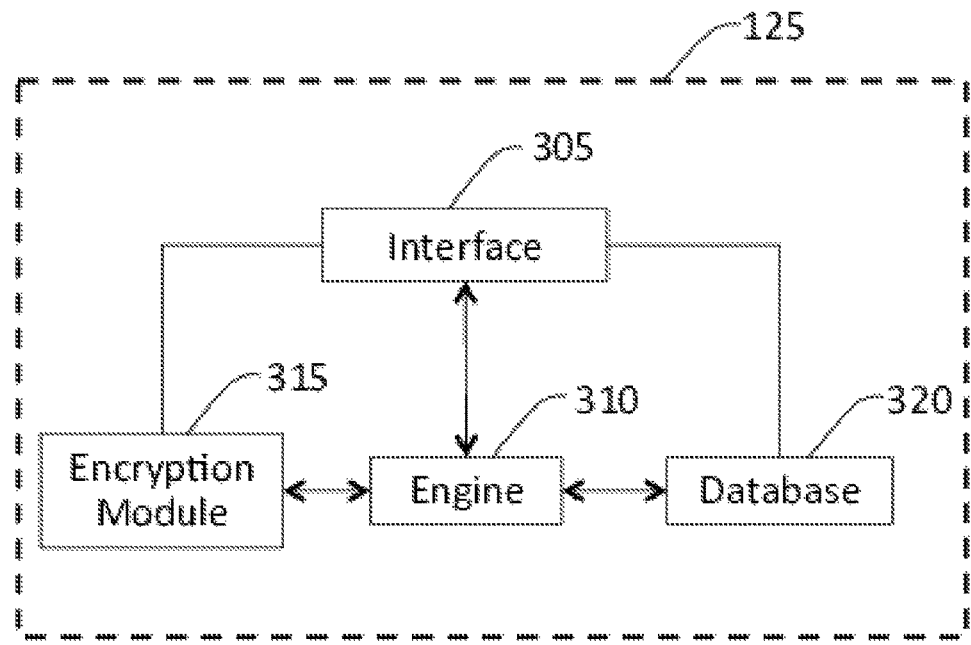
FIGS. 3A and 3B are exemplary functional block diagrams illustrating different implementations of server software 125.
Figure 3B:
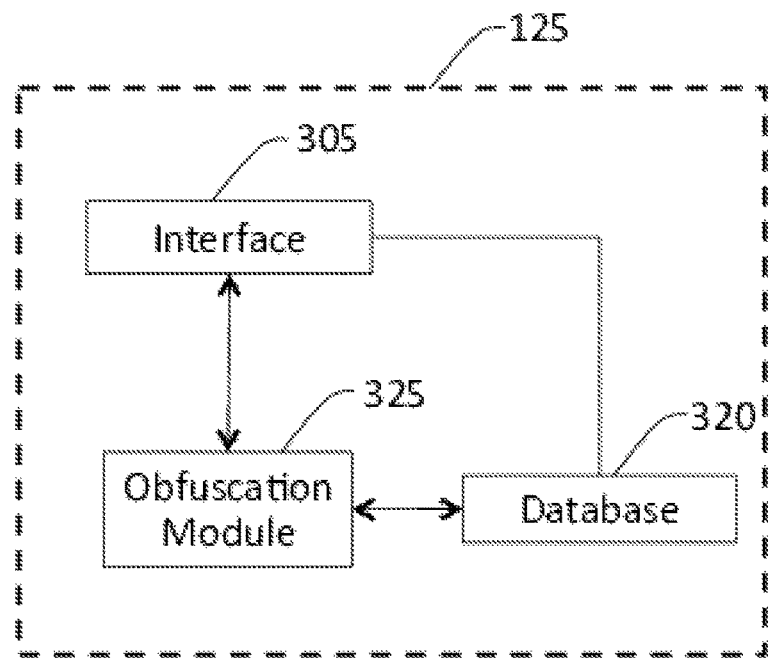

FIGS. 3A and 3B are exemplary functional block diagrams illustrating different implementations of server software 125. In one embodiment as depicted in FIG. 3A, the server software 125 generates a protected version of the digital content by installing one or more checks in the digital content and encrypting the digital content with a key which is at least partially based upon one or more device parameters. The device parameters may be one or more of for example, a device model, a device number, or any other attribute that identifies the client uniquely, for example, a SIM number, an Internet Protocol (IP) address, a MAC address, etc. In another embodiment as depicted in FIG. 3B, the server software generates the protected version of the digital content by installing one or more checks in the digital content and obfuscating the digital content such that the checks in the obfuscated digital content relate to at least one device parameter.

In either embodiment, additionally and optionally, the checks may also pertain to one or more non-device parameter(s) including without limitation an expiration date, a domain name, a browser type, an operating system type, a number of installations (namely, number of devices deployed to), a number of seats (namely, number of users using the installation), etc. For example, an expiration date check may ensure that an application user may not continue to use the application post its subscription period. This expiration period may be checked by communicating with a server if the application is allowed to execute or the application may check the system date, where it is running to determine if the expiration period has expired. In an embodiment, the checks may be a combination of device parameters and non-device parameters as mentioned above. The checks may be installed before encryption/obfuscation of the digital content, during encryption/obfuscation of the digital content or after the encryption/obfuscation of the digital content. Thus, for each device, one instance of protection is generated.

In FIG. 3A, the server software 125 includes an interface 305, an engine 310, an encryption module 315, and a database 320. The interface 305 receives/responds to a query received from the client 110. For example, when the client 110 requests for download of digital content, the interface 305 receives the query and requests for one or more device parameters from the client 110. Alternately, the interface 305 obtains the device parameter for example, the IP address from an entity associated with the client 110. The interface specifies the one or more device parameters in the request for the client. Optionally, the interface 305 may include a checking mechanism to determine if the requested digital content is stored in the database 325 or needs to be generated on the fly. In addition, the interface 305 transmits the requested content to the client 110.

The encryption module 315 installs one or more checks in the digital content such that the one or more checks are meant to validate whether the digital content is running on a right client. The checks validate at least one device parameter and optionally, one or more non-device parameters during execution of the digital content on the client 110. The encryption module 315 also encrypts the digital content with at least one device parameter. The device parameters correspond to the parameters of the device/client on which the digital content is to be installed. Alternately, the encryption module 315 may encrypt the digital content using at least one device parameter and at least one non-device parameter, for example, expiration date, domain names, etc. In an embodiment, the encryption module 315 installs checks in the digital content and thereafter, encrypts the digital content. The encryption module 315 may encrypt the digital content on the fly or in case if a device manufacturer's identification has some sort of structure (for example, the ID prefix is a model number), the encryption module 315 may encrypt the digital content and store it in the database 320. The encryption module 315 may use one or more symmetric and/or asymmetric encryption techniques for encryption.

The engine 310 generates a decryption logic (DC) that is needed to decrypt the encrypted digital content. In an embodiment, the decryption logic includes the logic required to generate a decryption key to be used to decrypt the encrypted digital content (EC). The decryption logic may use one or more encryption techniques, namely, symmetric and/or asymmetric encryption techniques. Optionally, the engine 310 may obfuscate the decryption logic (DC). The engine 310 concatenates DC (obfuscated or otherwise) and EC to generate a protected version of the digital content (PC). Thus, $$EC+DC=PC$$

In FIG. 3B, the server software 125 includes the interface 305, an obfuscation module 325 and the database 320. As described in FIG. 3A, the interface 305 receives/responds to the client 110 request and receives one or more device parameters from the client 110. The interface 305 also transmits the requested content to the client 110.

The obfuscation module 325 installs one or more checks in the digital content such that the one or more checks are meant to validate whether the digital content is running on a right client. The checks validate at least one device parameter and optionally, one or more non-device parameters during execution of the digital content on the client 110. The obfuscation module 325 also generates an obfuscated version of the digital content for the requesting client 110. In an embodiment, the obfuscation module 325 installs the checks in the digital content and obfuscates the digital content simultaneously. Alternately, the obfuscation module 325 first installs the checks in the digital content and thereafter, obfuscates the digital content. In an embodiment, the obfuscation module 325 generates an obfuscated version of the digital content using at least one device parameter of the requesting device and optionally, at least one non-device parameter on the fly. In an alternate embodiment, if a device manufacturer's identification has some sort of structure (for example, the ID prefix is a model number), the obfuscation module 325 generates obfuscated versions of the digital content that work for all models and stores them in the database 320.

It may be seen from above that the server software 125 provides for transformation of the original source code of the digital content into an equivalent code in terms of functionality but whose original source code is protected using the techniques described above. The server software 125 installs one or more checks that restrict the execution of the digital content to a specific device on which it is to be executed, also referred to as a device lock mechanism.

In an embodiment, the application distribution system can enforce license agreements by applying device lock mechanism to the digital content to ensure that the digital content is not executed by a third party. In such case, the protected version may be encrypted/obfuscated using one or more device parameters and the Internet domain that the application buyer is using. In another embodiment, if the application distribution system generates protected versions for each device type, the application distribution system may require the device ID or another device parameter to have some structure to generate protected versions for each device type. In such case, protection on the fly may not be necessary, because the number of different protected versions of the digital content may not be high, and it may be feasible to generate them all in advance and store them in the database 320.

FIGS. 3A and 3B are exemplary. It is possible that the server software 125 may be a combination of the features described in FIGS. 3A and 3B. In such case, the interface 305 may decide whether the requested digital content may be encrypted or obfuscated. In an embodiment, the interface 305 may decide the protection type to be applied to digital content based on the type of digital content to protect. For example, if the digital content is a game, security application, etc as each type of digital content has different requirement of computational resources. Alternately, the interface 305 may decide the protection type to be applied to digital content based on the type of a client. In yet another embodiment, it may be possible that the client requests the level of protection it desires. It may be apparent that the decision making capability of the interface 305 is not restrictive to the examples described rather it includes all such variations which fall within the scope of the teachings of the present disclosure.

Figure 4A:
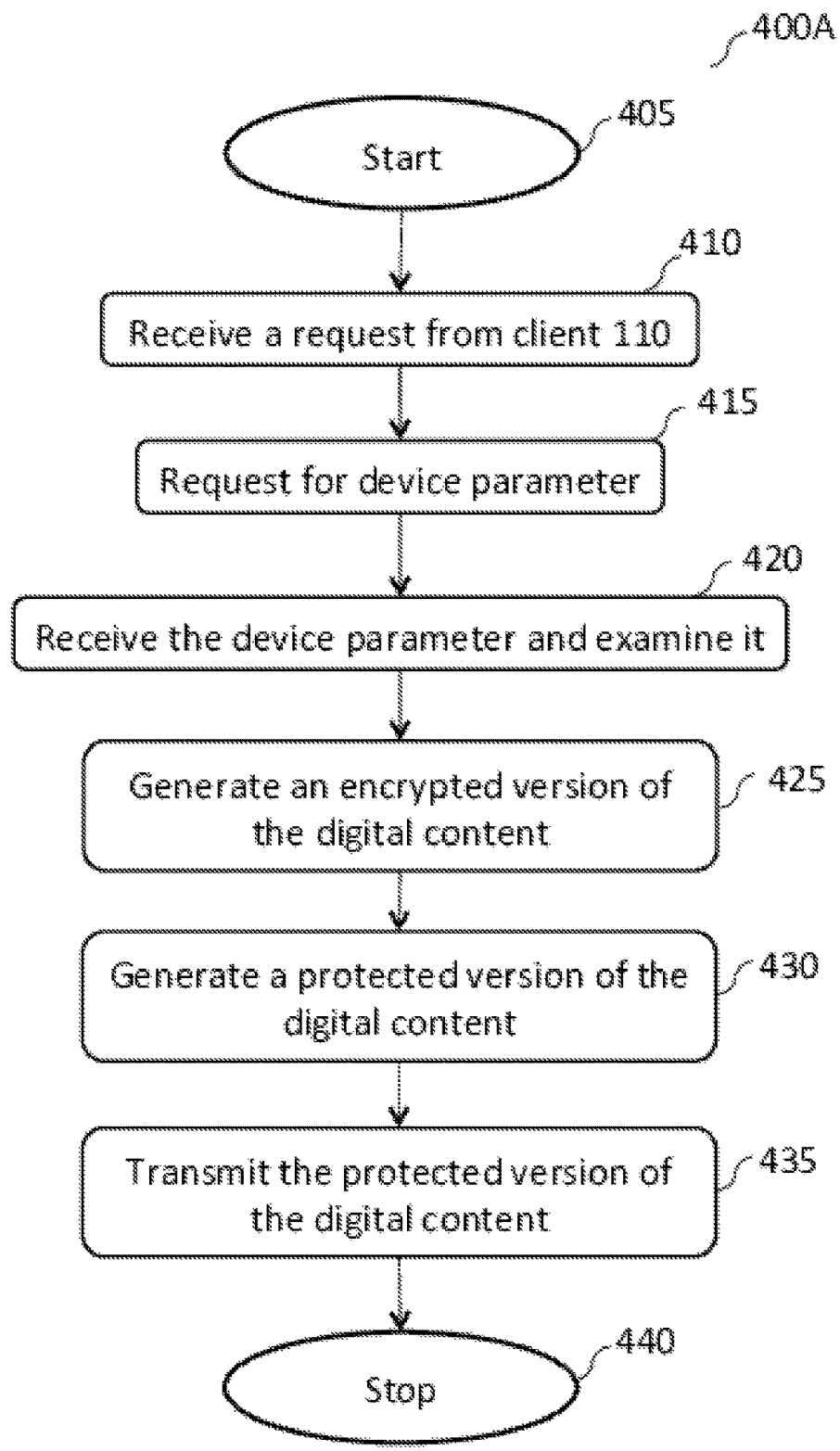
FIGS. 4A and 4B illustrate exemplary flowcharts depicting the process followed at the server for generating a protected version of the digital content via encryption and obfuscation respectively.

FIG. 4A illustrates a flowchart 400A depicting the process followed at the server for generating a protected version of the digital content via encryption. At step 405, the server initiates the process of generating a protected version of the digital content via encryption. At step 410, the server receives a request from a client for transmitting the digital content. The request may be a Hypertext Transfer Protocol (HTTP) or Hypertext Transfer Protocol Secure (HTTPS) request. The interface interprets the request and in turn requests for one or more device parameters at step 415. The interface may specify in the request one or more device parameter(s) that it is requesting, for example, a device model, a device number, a device make, an IP address, etc. At step 420, the interface receives the device parameter and examines the same. For example, in case the received device parameter is the device model, device type or device make, the interface may examine if a protected version of the digital content for the corresponding device parameter is stored in the database. If the protected version of the digital content is stored in the database, the process jumps to step 435. Alternately, the interface may examine if the protected version of the digital content has to be generated on the fly. The interface may also examine the protection type for the digital content as described above.

At step 425, an encrypted version of the digital content is generated. In one embodiment, the encryption module installs one or more checks in the digital content. The checks may be for example, short codes that require validation of at least one device parameter contained in the check while the digital content is executed on a client. Thereafter, the encryption module encrypts the digital content containing installed checks with one or more device parameters using one or more symmetric and/or asymmetric encryption techniques. In another embodiment, the encryption module installs one or more checks and encrypts the digital content simultaneously to generate encrypted digital content (EC).

At step 430, a protected version which is to be transmitted to the client is generated. The engine generates a decryption logic (DC) which upon execution, generates a decryption key. This decryption logic is executed at the client and will generate the decryption key using the device parameter(s)

obtained from the client. The engine concatenates the encrypted digital content (EC) and the decryption logic (DC) to generate a protected version of the digital content. Thus, the protected version of the digital content (PC) does not contain the decryption key rather it contains the decryption logic that in turn generates the decryption key on the client during execution. The decryption key may be a function of for example, device model, device make, IP address of the device, device ID (DID), etc.

At step 435, the protected version is transmitted to the requesting client. The process stops at step 440.

Figure 4B:
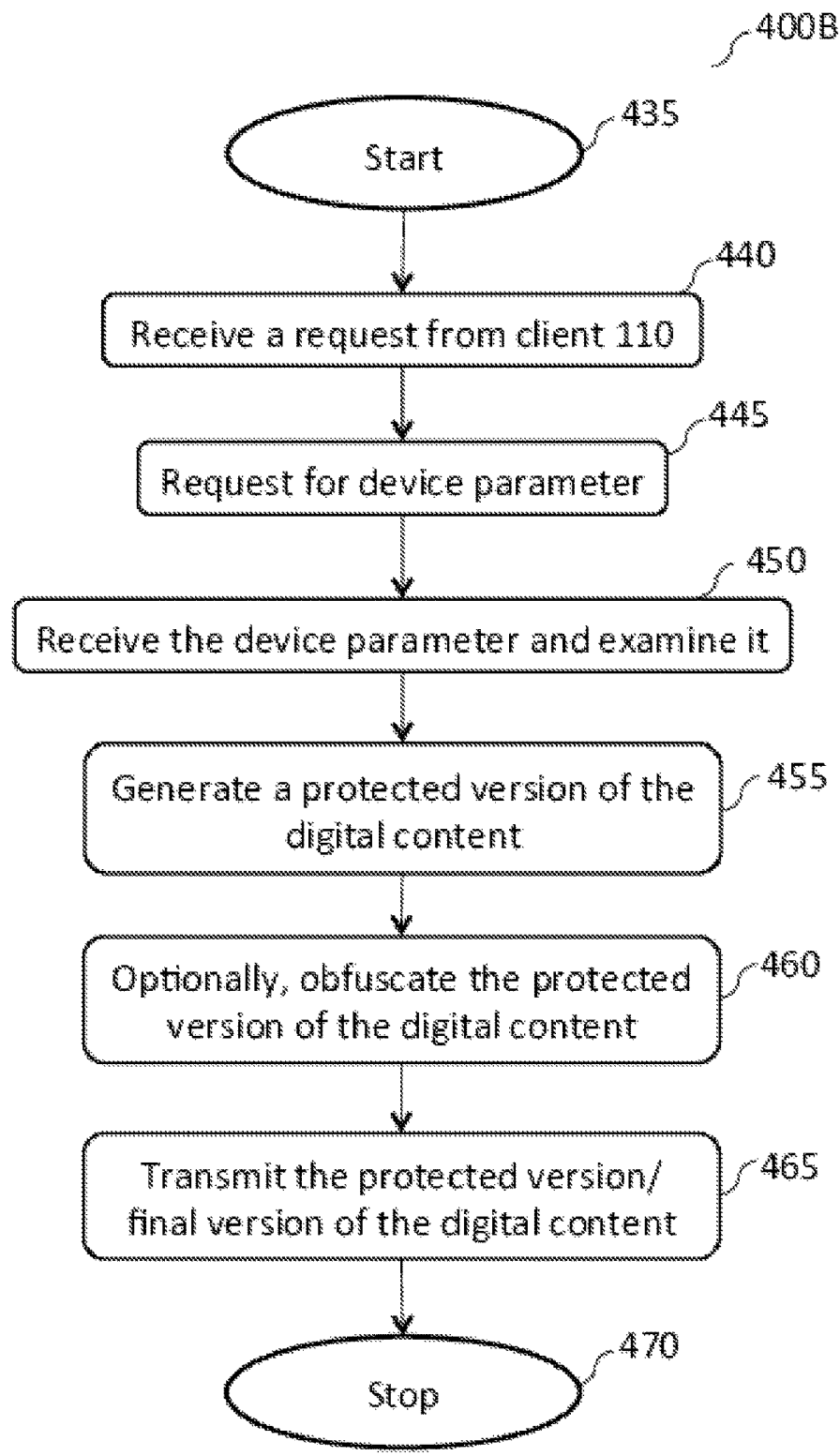

FIG. 4B illustrates a flowchart depicting the process followed at the server for generating a protected version of the digital content via obfuscation which starts at step 435. At step 440, the server receives a request from a client for transmitting the digital content. The request may be a HTTP or HTTPS request. The interface interprets the request and in turn requests for one or more device parameter at step 445. The interface may specify in the request the type of device parameter(s) that it is requesting, for example, device model, device number, device make, etc. At step 450, the interface receives the device parameters and examines the same. For example, in case the received device parameter is the device model, device type or device make, the interface may examine if a protected version of the digital content for the corresponding device parameter is stored in the database. If the protected version of the digital content is stored in the database, the process jumps to step 465. Alternately, the interface may examine if the protected version of the digital content has to be generated on the fly. The interface may also examine the protection type for the digital content as described above.

At step 455, a protected version of the digital content is generated. The obfuscation module installs one or more checks in the digital content. In an embodiment, the checks may be short codes that require validation of at least one device parameter contained in the check while the digital content is executed on a client. Thereafter, the obfuscation module obfuscates the digital content with installed checks using one or more device parameters to generate a protected version of the digital content. In another embodiment, the obfuscation module installs one or more checks and obfuscates the digital content simultaneously to generate the protected version of the digital content. Optionally, at step 460, at least one more layer of obfuscation is provided to the protected content to yield the final version of the digital content. This is done to make it further difficult to run the digital content on a wrong client. At step 465, the protected version/final version is transmitted to the requesting client. The process stops at step 470.

Figure 5A:
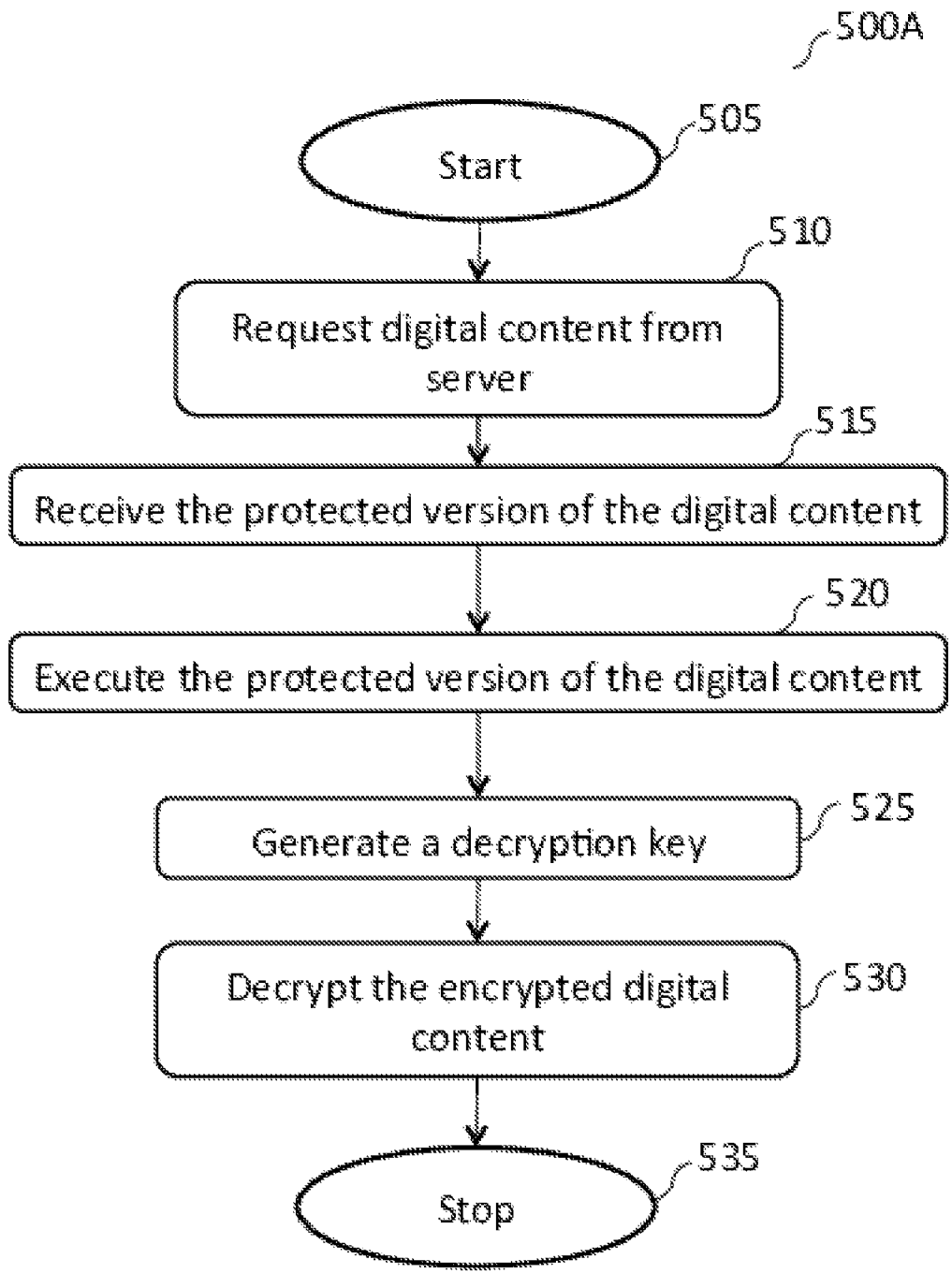
FIGS. 5A and 5B illustrate exemplary flowcharts depicting the process followed at the client for executing a protected version of the digital content via encryption and obfuscation respectively.

FIG. 5A illustrates a flowchart 500A corresponding to the process at the client device when dealing with an encryption based protected digital content of FIG. 4A. At step 505, the process at client initiates. At step 510, the client requests digital content from the server. For example, a user accesses a webpage via a web browser and clicks on a download button of the webpage to obtain the digital content. Further, when queried by the server, the client provides the details of one or more device parameters requested. At step 515, the client receives the protected version of the digital content transmitted by the server to the web browser.

At step 520, the protected version of the digital content is executed. This results in the encrypted code and the decryption logic. The decryption logic initiates generation of the decryption key at step 525. For this, the decryption logic requires device parameter(s) and therefore, accesses device information directly or indirectly, using for example, JavaScript. Indirect access to a DID may include the use of native code or native frameworks specific to a mobile platform. A correct decryption key will be generated only if the protected version of the digital content is executed on a correct client device. In an embodiment, the decryption logic retrieves the decryption key every time the digital content is executed and may be automatic and transparent to the client user. This may be considered as first check at the client device.

At step 530, the device locked encrypted digital content is decrypted and one or more checks (the device lock, domain lock, expiration date, etc) present in the digital content are implemented. For instance, first the encrypted digital content is decrypted using the decryption key and thereafter, the one or more checks are implemented. The decryption process will be successful only if the digital content is executed on the correct device as the device parameter in the encrypted digital content would match with the actual device parameters on which the digital content is executed, and unsuccessful if any other device is used. Further, the one or more checks serve as a validation mechanism that controls the execution of the digital content. The one or more checks use the device parameters accessed by the decryption logic for validation. In an optional embodiment, if the one or more checks pertain to non-device parameters also, then such checks will be validated too.

Every time the digital content is executed besides installation, the above procedure is repeated. Once the digital content is closed or terminated, the digital content remains stored on the client in encrypted form. Thus, every time the digital content is executed, the checks are validated and only upon successful validation, the digital content executes/functions on the client. This ensures that even if the digital content is transported to an unauthorized device, it will not work as the generated decryption key will be incorrect and the checks will not be validated due to different device parameters. The process stops at 535.

Figure 5B:
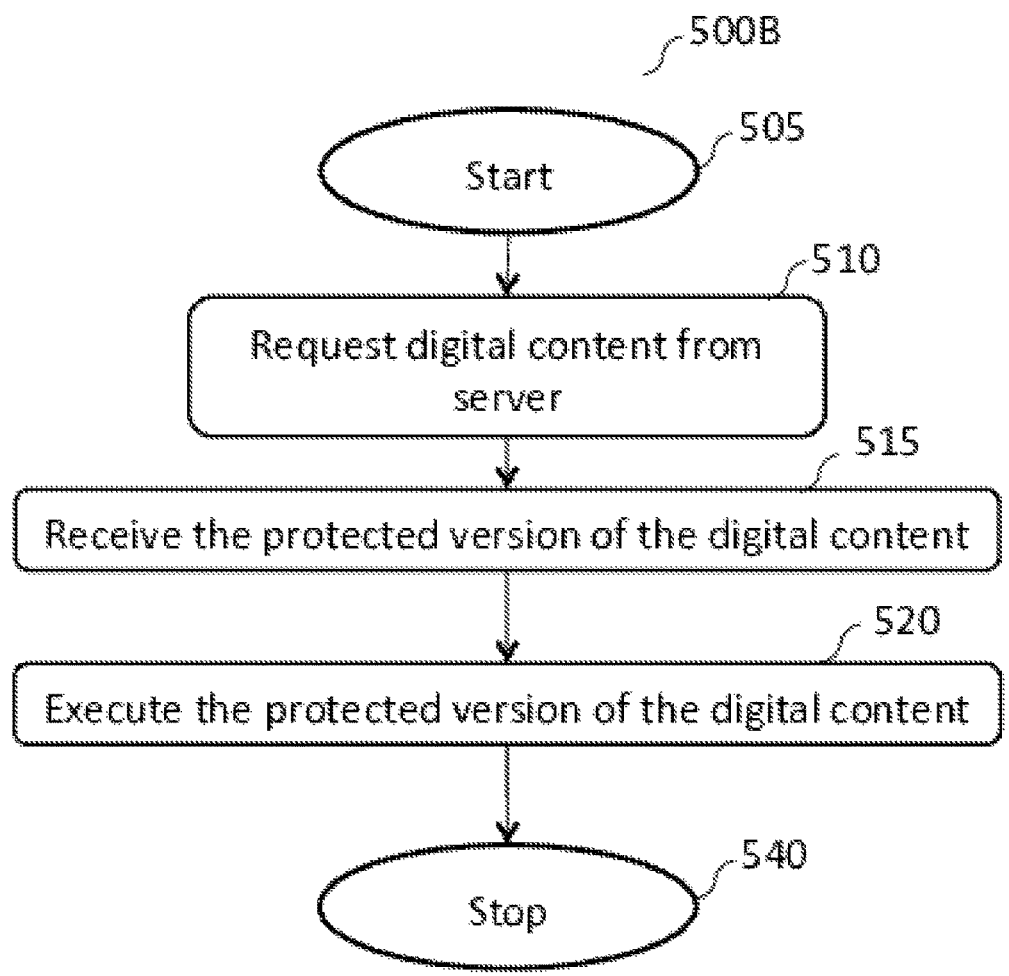

FIG. 5B illustrates a flowchart 500B corresponding to the process at the client device when dealing with obfuscation based protected digital content of FIG. 5B. At step 505, the process at client initiates. At step 510, the client requests digital content from the server. For example, a user accesses a webpage via a web browser and clicks on a download button of the webpage to obtain the digital content. Further, when queried by the server, the client provides the details of one or more device parameters requested. At step 515, the client receives the protected version of the digital content transmitted by the server to the web browser.

At step 520, the protected version of the digital content is executed. During execution, the device parameter is required for successful execution of the digital content. Therefore, device information is accessed directly or indirectly, using for example, JavaScript. Indirect access to a DID may include the use of native code or native frameworks specific to a mobile platform. Once the device parameters are obtained, the checks installed in the obfuscated digital content are validate only if the device parameters are same as those in the obfuscated digital content. The process stops at 540.

In an embodiment, the checks may run not only at the time of installation but each time the application is executed. In an embodiment, the checks (also referred to as 'device lock checks') may be scattered all over the digital content code and it may be highly non-trivial to spot them and disable them successfully. Unsuccessful attempts to disable the checks may break the code (i.e. the code may not execute correctly).

A number of variations of the various embodiments described above are within the scope of the teachings of the present disclosure. For example, the protected version of the digital content may be encrypted/obfuscated again once or multiple times. Another example would pertain to obfuscation/encryption of the decryption logic. Accordingly, it may be noted that any such variations are within the scope of the present disclosure.

No element, act, or instruction used in the description of the present application should be construed as critical or essential to the invention unless explicitly described as such. Also, as used herein, the article "a" is intended to include one or more items. Where only one item is intended, the term "one" or similar language is used.

The invention claimed is:

1. A method for generating a protected version of a digital content in a server, the digital content including an original source code, the method comprising:
   installing at least one check in the digital content, the at least one check comprising at least one device or non-device parameter, wherein the at least one check is successfully validated when executed on a client corresponding to the at least one device parameter;
   encrypting the digital content including the installed at least one check using the at least one device or non-device parameter at the server, wherein the encrypted digital content can be decrypted using a decryption key, and the decryption key is based on the at least one device or non-device parameter;
   generating a decryption logic configured to generate the decryption key using the at least one device or non-device parameter at the client; and
   concatenating the encrypted digital content and the decryption logic to generate a protected version of the digital content; and
   sending the protected version of the digital content such that the client is permitted to generate the decryption key using the decryption logic and only the client can execute the encrypted digital content after a successful decryption of the encrypted digital content.

2. The method of claim 1, wherein the encrypting comprises encrypting the digital content in real-time.

3. The method of claim 1, wherein the encrypting comprises encrypting using one or more of symmetric and asymmetric encryption techniques.

4. The method of claim 1 further comprising obfuscating the decryption logic at the server.

5. The method of claim 1, further comprising obfuscating the digital content including the installed at least one check at the server.

6. The method of claim 1, wherein the at least one device or non-device parameter includes one or more of an expiration date, a domain name, a browser type, an operating system type, a number of installations, and/or a number of seats.

7. The method of claim 1, wherein the at least one device or non-device parameter comprises one or more of a device number, a device type, a subscriber identity module (SIM) number, an Internet protocol (IP) address, a media access control (MAC) address and a device model.

8. The method of claim 1 further comprising at least one of encrypting or obfuscating the protected version of the digital content.

9. The method of claim 1, wherein the at least one check is successfully validated when executed on a client corresponding to the at least one device parameter.

10. A server comprising:
    a communication interface configured to receive data from a client over a network; and
    a processor configured to,
       install at least one check in the digital content, wherein the digital content comprises an original source code, wherein the at least one check corresponds to at least one device or non-device parameter, and obfuscate the digital content using the at least one device parameter, wherein the obfuscated digital content comprises a valid executable code that maintains an underlying functionality of the original source code of the digital content.

11. The server of claim 10, wherein the processor is configured to install the at least one check and obfuscate the digital content simultaneously.

12. The server of claim 10, wherein the processor is configured to first install the at least one check and thereafter obfuscate the digital content including installed checks.

13. The server of claim 10, wherein the at least one device or non-device parameter comprises one or more of a device number, a device type, a subscriber identity module (SIM) number, an Internet protocol (IP) address, a media access control (MAC) address, and a device model.

14. A tangible, non-transitory computer readable medium having instructions recorded thereon which, when implemented by a processor on a server, causes the server to:
    install at least one check in a digital content, wherein the digital content comprises an original source code, the at least one check comprising at least one device parameter, wherein the at least one check is successfully validated when executed on a client corresponding to the at least one device or non-device parameter; and
    encrypt the digital content including the installed at least one check using the at least one device or non-device parameter at a server, wherein the encrypted digital content can be decrypted using a decryption key, and wherein the decryption key is based on the at least one device or non-device parameter;
    generate a decryption logic configured to generate the decryption key using the at least one device or non-device parameter at the client; and
    concatenate the encrypted digital content and the decryption logic to generate a protected version of the digital content; and
    send the protected version of the digital content such that the client is permitted to generate the decryption key using the decryption logic and only the client can execute the encrypted digital content after a successful decryption of the encrypted digital content.

* * * * *